(12) United States Patent
Mondragon-Parra et al.

(10) Patent No.: US 12,234,864 B2
(45) Date of Patent: Feb. 25, 2025

(54) CONSTANT VELOCITY JOINT WITH ASYMMETRIC OPPOSED TRACKS

(71) Applicant: STEERING SOLUTIONS IP HOLDING CORPORATION, Saginaw, MI (US)

(72) Inventors: Eduardo Raul Mondragon-Parra, Freeland, MI (US); Damin J Siler, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 231 days.

(21) Appl. No.: 16/440,481

(22) Filed: Jun. 13, 2019

(65) Prior Publication Data

US 2019/0383330 A1 Dec. 19, 2019

Related U.S. Application Data

(60) Provisional application No. 62/685,405, filed on Jun. 15, 2018.

(51) Int. Cl.
*F16D 3/223* (2011.01)
*F16D 3/2237* (2011.01)

(52) U.S. Cl.
CPC .. *F16D 3/2237* (2013.01); *F16D 2003/22303* (2013.01); *Y10S 464/906* (2013.01)

(58) Field of Classification Search
CPC ......... F16D 3/2237; F16D 2003/22303; F16D 3/223; F16D 2003/22309; Y10S 464/906
USPC ......................................................... 464/145
See application file for complete search history.

(56) References Cited

U.S. PATENT DOCUMENTS

| 3,475,924 | A | 11/1969 | Aucktor et al. |
| 5,221,233 | A | 6/1993 | Jacob |
| 6,672,965 | B2 | 1/2004 | Hildebrandt et al. |
| 6,709,337 | B2 | 3/2004 | Krude |

(Continued)

FOREIGN PATENT DOCUMENTS

| CN | 1508453 A | 6/2004 |
| CN | 101218447 A | 7/2008 |

(Continued)

OTHER PUBLICATIONS

Official Letter issued by IN Patent Office regarding corresponding IN App. No. 2019440213653; issued Feb. 12, 2021.

(Continued)

*Primary Examiner* — Greg Binda
(74) *Attorney, Agent, or Firm* — Dickinson Wright PLLC

(57) ABSTRACT

A constant velocity joint assembly includes an outer joint member defining a first longitudinal axis and including a closed end, an open end, a first set of outer tracks extending at least partially between the closed end and the open end, and a second set of outer tracks extending at least partially between the closed end and the open end. The assembly also includes an inner joint member defining a second longitudinal axis coaxial with the first longitudinal axis and including a first set of inner tracks and a second set of inner tracks, the inner joint including an attachment feature to receive a driveshaft. A path followed by the center of a ball in the first set of tracks is constrained by an outer race track path and an inner race track path, the outer race track path being a piecewise continuous function.

2 Claims, 9 Drawing Sheets

(56) References Cited

U.S. PATENT DOCUMENTS

| | | |
|---|---|---|
| 6,709,338 B2 | 3/2004 | Weckerling et al. |
| 6,796,906 B2 | 9/2004 | Cermak |
| 6,848,999 B2 | 2/2005 | Weckerling et al. |
| 6,872,143 B2 | 3/2005 | Weckerling et al. |
| 7,001,281 B2 | 2/2006 | Krude |
| 7,022,022 B2 | 4/2006 | Hassenrik et al. |
| 7,112,140 B2 | 9/2006 | Weckerling |
| 7,393,284 B2 | 7/2008 | Hassenrik et al. |
| 7,396,285 B2 | 7/2008 | Weckerling |
| 7,426,107 B2 | 9/2008 | Yeh et al. |
| 7,462,107 B2 | 12/2008 | Krude |
| 7,507,160 B2 | 3/2009 | Maucher et al. |
| 7,607,985 B2 | 10/2009 | Krude et al. |
| 7,621,816 B2 | 11/2009 | Weckerling et al. |
| 7,632,189 B2 | 12/2009 | Schwarzler et al. |
| 7,686,695 B2 | 3/2010 | Maucher et al. |
| 7,854,658 B2 | 12/2010 | Schwarzler et al. |
| 7,927,220 B2 | 4/2011 | Weckerling et al. |
| 8,096,887 B2 | 1/2012 | Oh et al. |
| 8,216,075 B2 | 7/2012 | Weckerling et al. |
| 8,251,829 B2 | 8/2012 | Weckerling et al. |
| 9,133,888 B2 * | 9/2015 | Gremmelmaier ....... F16D 3/223 |
| 9,464,674 B2 * | 10/2016 | Yamazaki ................. F16D 3/24 |
| 2009/0143150 A1 | 6/2009 | Kozlowski et al. |
| 2013/0324268 A1 * | 12/2013 | Choi ...................... F16D 3/223 |
| 2014/0206463 A1 | 7/2014 | Gremmelmair et al. |

FOREIGN PATENT DOCUMENTS

| | | |
|---|---|---|
| CN | 103946571 A | 7/2014 |
| DE | 10060220 A1 | 6/2002 |
| DE | 102004018777 A1 | 3/2005 |
| EP | 2908020 A1 | 8/2015 |

OTHER PUBLICATIONS

English Translation of Official Letter issued by DE Patent Office regarding related DE App. No. 10 2019 116 251.3; Issued Mar. 23, 2020.

English Translation of Office Action regarding corresponding CN App. No. 2019105202464; issued May 7, 2021.

* cited by examiner

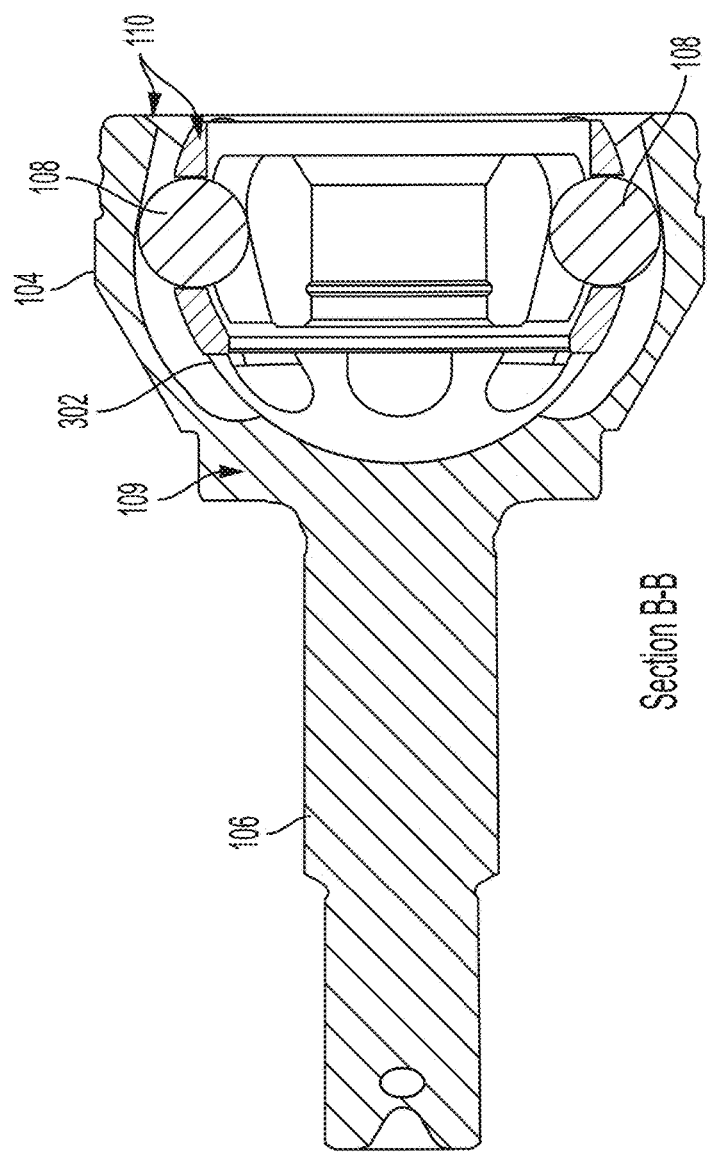
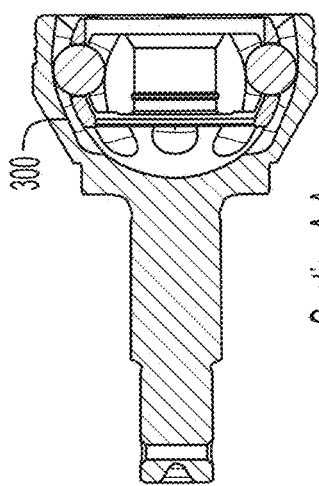
Section B-B
Figure 2C
Section A-A
Figure 2B

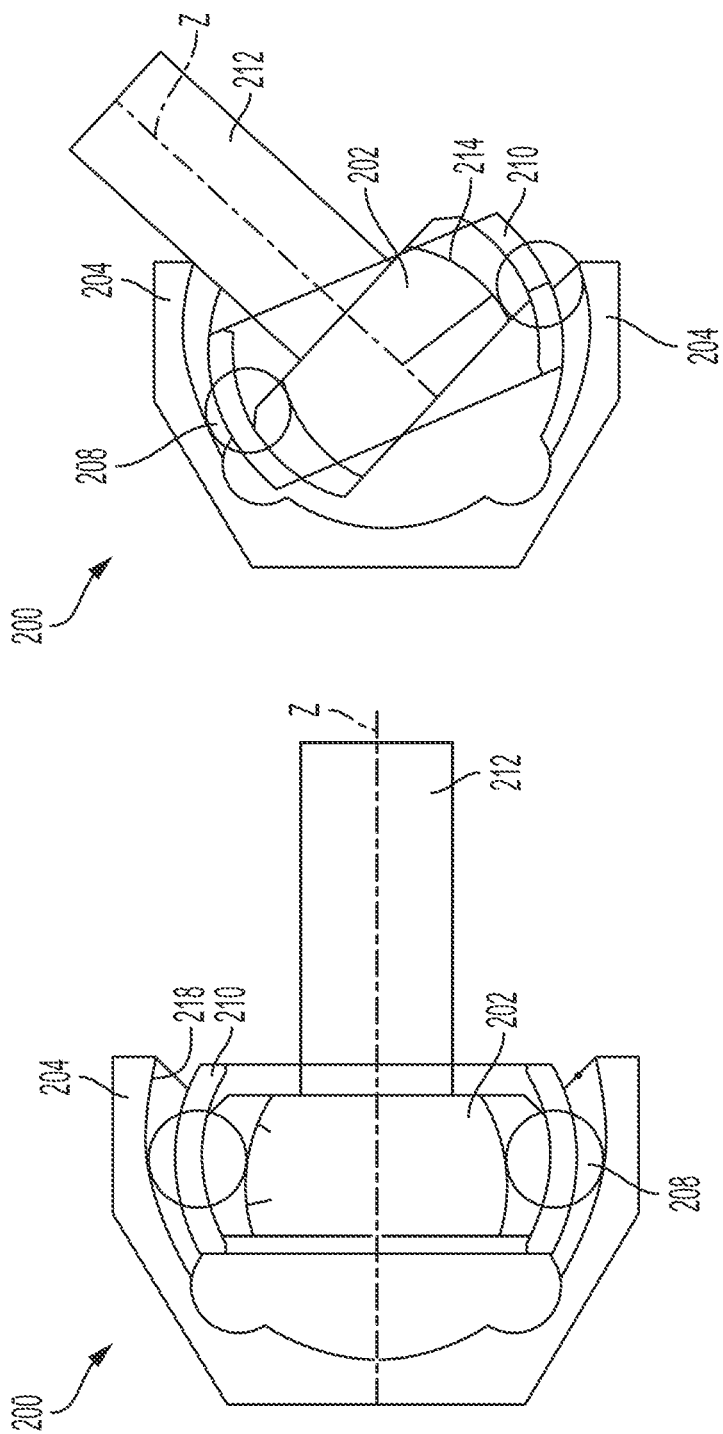

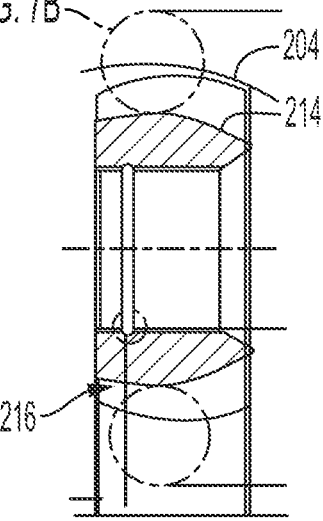 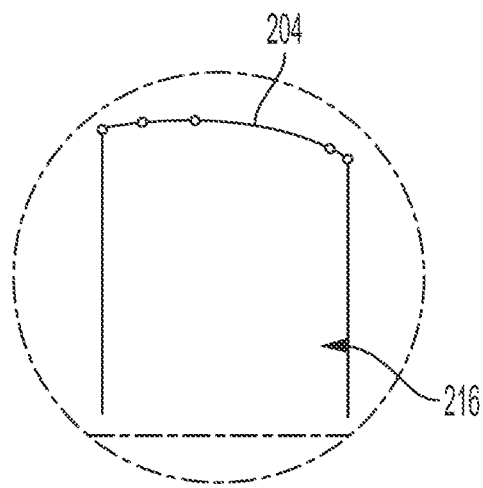
FIG. 7A   FIG. 7B
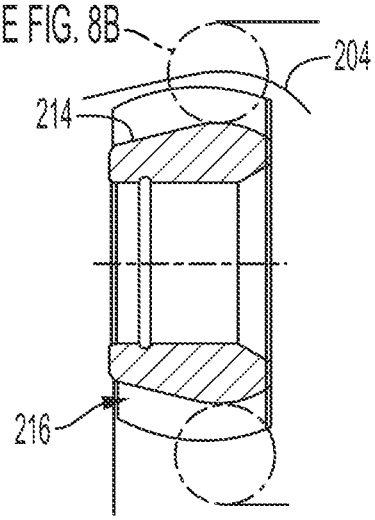 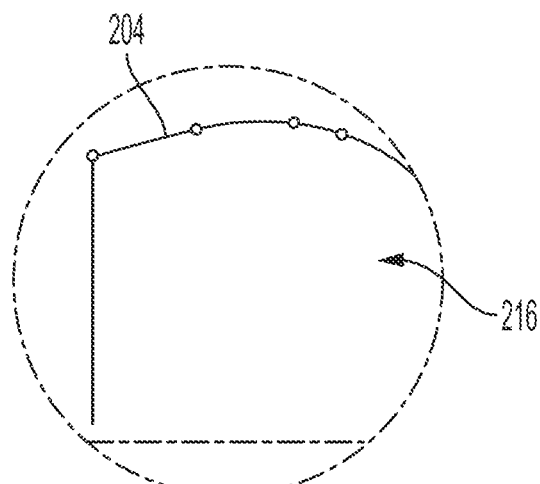
FIG. 8A   FIG. 8B

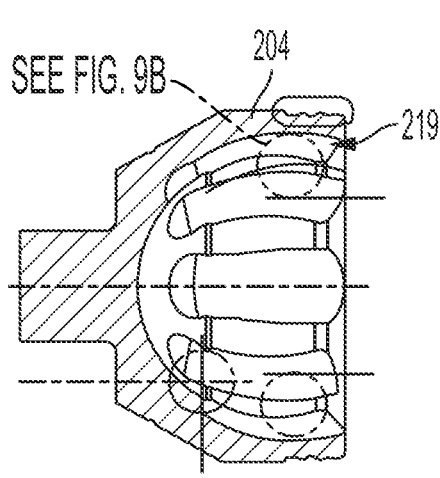 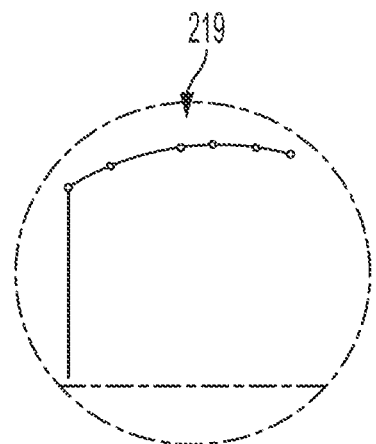
FIG. 9A          FIG. 9B
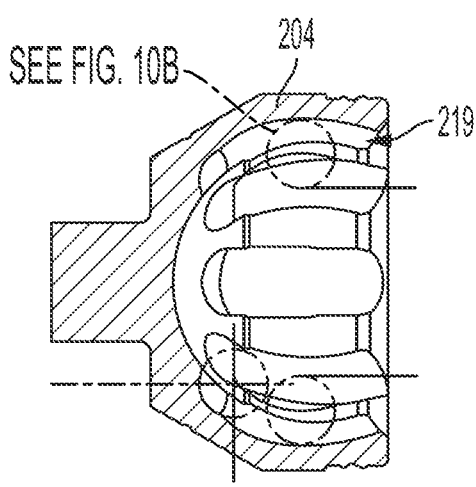 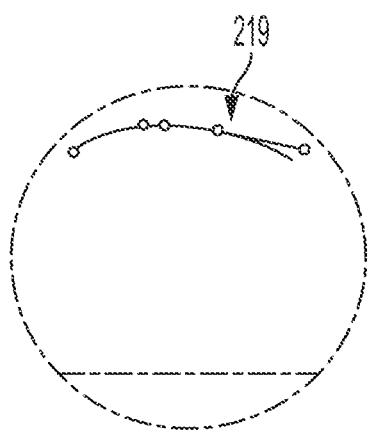
FIG. 10A         FIG. 10B

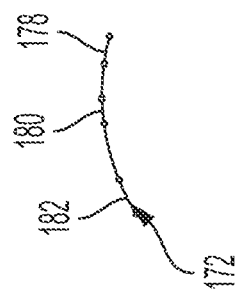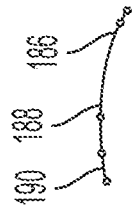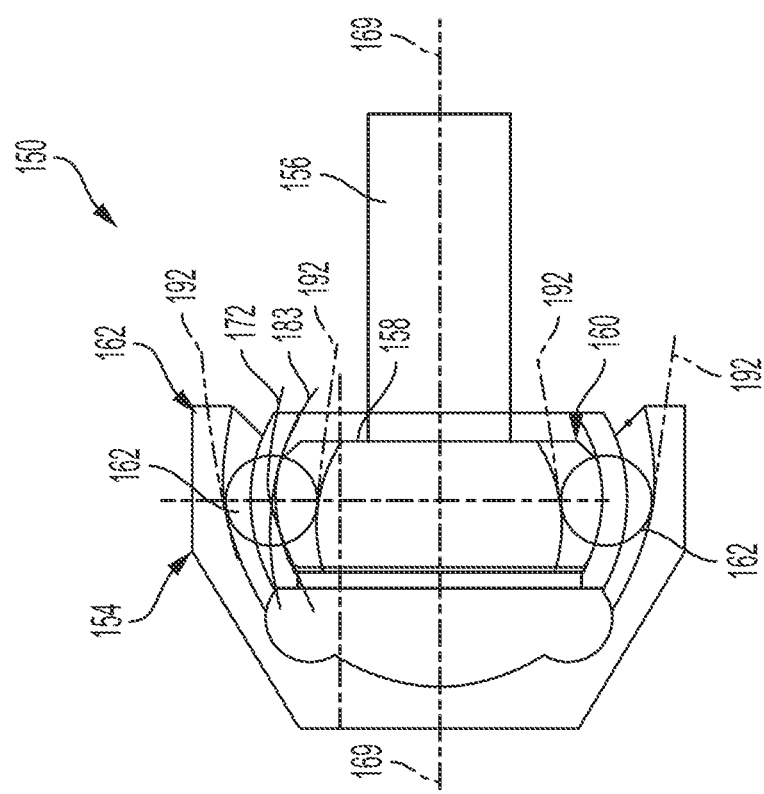

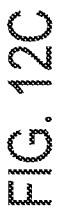
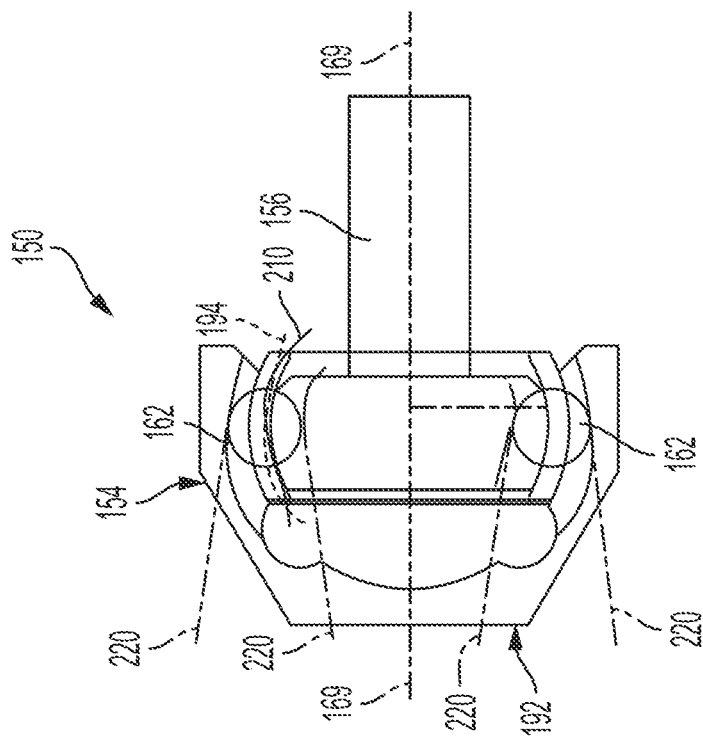
FIG. 12A
FIG. 12B
FIG. 12C

CONSTANT VELOCITY JOINT WITH ASYMMETRIC OPPOSED TRACKS

CROSS-REFERENCE TO RELATED APPLICATIONS

This application claims the benefit of U.S. Provisional Patent Application Ser. No. 62/685,405 filed, Jun. 15, 2018, which is incorporated herein by reference in its entirety.

BACKGROUND

Constant velocity joints may be used in a driveline for a vehicle that transfers a rotational torque from one driveline component to another driveline component. The constant velocity joint facilitates angular displacement or angular movement of components that are interconnected by the constant velocity joint while still facilitating the transmission of torque.

SUMMARY

Disclosed is a constant velocity joint assembly. The assembly includes an outer joint member defining a first longitudinal axis and including a closed end, an open end, a first set of outer tracks extending at least partially between the closed end and the open end, and a second set of outer tracks extending at least partially between the closed end and the open end. The assembly also includes an inner joint member defining a second longitudinal axis coaxial with the first longitudinal axis and including a first set of inner tracks and a second set of inner tracks, the inner joint including an attachment feature to receive a driveshaft. A path followed by the center of a ball in the first set of tracks is constrained by an outer race track path and an inner race track path, the outer race track path being a piecewise continuous function defined by a first straight segment with a positive slope, followed by a second concave arch segment, followed by a third straight segment with a negative slope, the inner race track path being a piecewise continuous function defined by a first straight segment with a positive slope, followed by a second convex arch segment, followed by a third straight segment with a negative slope, wherein the tangencies between the ball and outer and inner race tracks form a first funnel extending towards the open end of the outer race. The path is followed by the center of a ball in the second set of tracks is constrained by an outer race track path and an inner race track path, the outer race track path being a piecewise continuous function defined by a first concave arch segment, followed by a second concave arch segment with a curvature smaller than the first segment and tangent to the first segment, followed by a third straight segment with a negative slope, the inner race track path being a piecewise continuous function defined by a first straight segment with a positive slope, followed by a second convex arch segment, followed by a third convex arch segment with a curvature larger than the second arch segment and tangent to the second segment, wherein the tangencies between the ball and outer and inner race tracks form a second funnel.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2B is a side view, in cross-section taken along line A-A of FIG. 2A, of the constant velocity joint assembly, showing the first set of tracks;

FIG. 2C is a side view, in cross-section taken along line B-B of FIG. 2A, of the constant velocity joint assembly, showing the second set of tracks;

FIG. 3 is a front view, in cross-section, of a portion of an example of a constant velocity joint assembly shown in a first configuration;

FIG. 4 is a front view, in cross-section, of the portion of the constant velocity joint assembly of FIG. 3 shown in a second configuration;

FIG. 7A is a sectional view of an example of an inner joint of member a constant velocity joint assembly;

FIG. 7B is a detailed view of a portion of the path followed by the first set of tracks of the inner joint member of FIG. 7A;

FIG. 8A is a different sectional view of the same inner joint member of a constant velocity joint assembly shown in FIG. 8A;

FIG. 8B is a detailed view of a portion of the path followed by the second set of tracks of the inner joint member of FIG. 8A;

FIG. 9A is a sectional view of an example of an outer joint of a constant velocity joint assembly;

FIG. 9B is a detailed view of a portion of the path followed by the first set of tracks of the outer joint member of FIG. 9A;

FIG. 10A is a different sectional view of the same outer joint member of a constant velocity joint assembly shown in FIG. 10A;

FIG. 10B is a detailed view of a portion of the path followed by the second set of tracks of the outer joint member of FIG. 10A;

FIG. 11A is a side view, in cross-section, showing the first set of tracks of a constant velocity joint assembly;

FIG. 11B is a detailed view of a portion of the path followed by the first set of tracks of the outer joint member of FIG. 11A;

FIG. 11C is a detailed view of a portion of the path followed by the first set of tracks of the inner joint member of FIG. 11A;

FIG. 12A is a side view, in cross-section, showing the second set of tracks, of a constant velocity joint assembly;

FIG. 12B is a detailed view of a portion of the path followed by the second set of tracks of the outer joint member of FIG. 12A; and FIG. 12C is a detailed view of an example of an outer track of the second configuration of tracks of FIG. 12A.

DETAILED DESCRIPTION

Referring now to the Figures, where the present disclosure will be described with reference to specific embodiments, without limiting same, it is to be understood that the disclosed embodiments are merely exemplary of the present disclosure that is embodied in various and alternative forms. The Figures are not necessarily to scale; some features are exaggerated or minimized to show details of particular components. Therefore, specific structural and functional details disclosed herein are not to be interpreted as limiting, but merely as a representative basis for teaching one skilled in the art to variously employ the present disclosure.

Figure 1B:
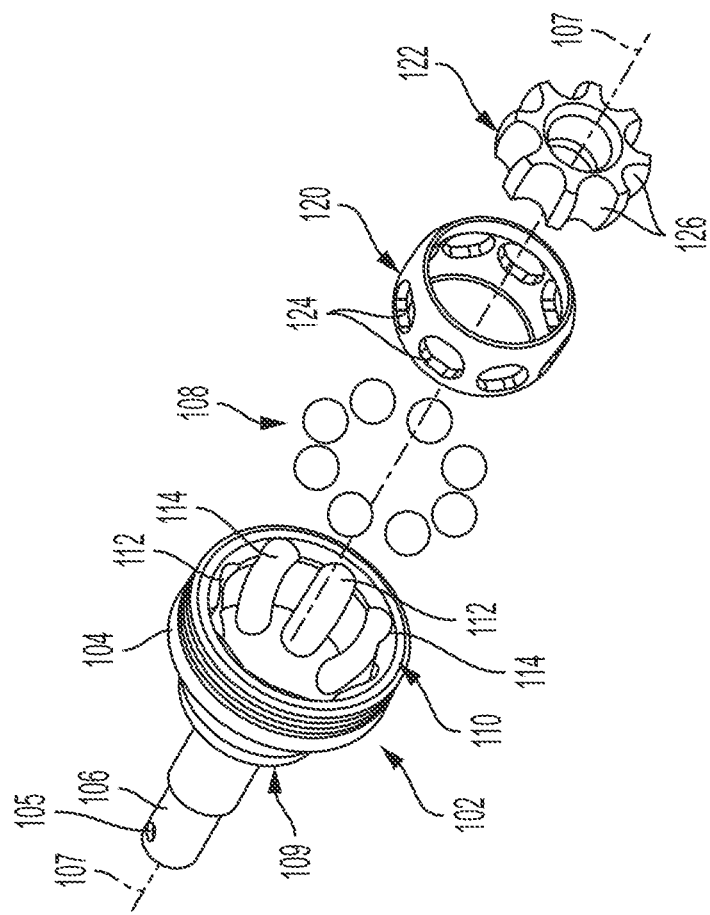
FIG. 1B is an exploded perspective view of the portion of the constant velocity joint assembly of FIG. 1A.
Figure 1A:
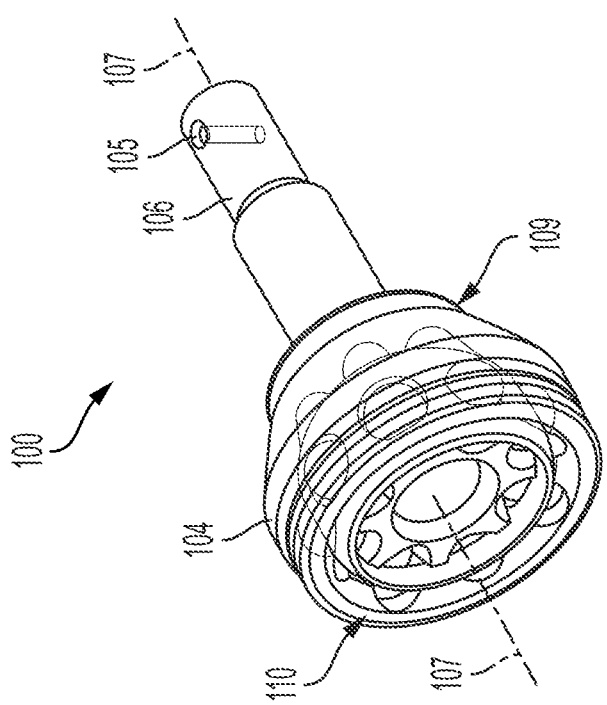
FIG. 1A is a perspective view of an example of a portion of a constant velocity joint assembly.
Figure 2A:
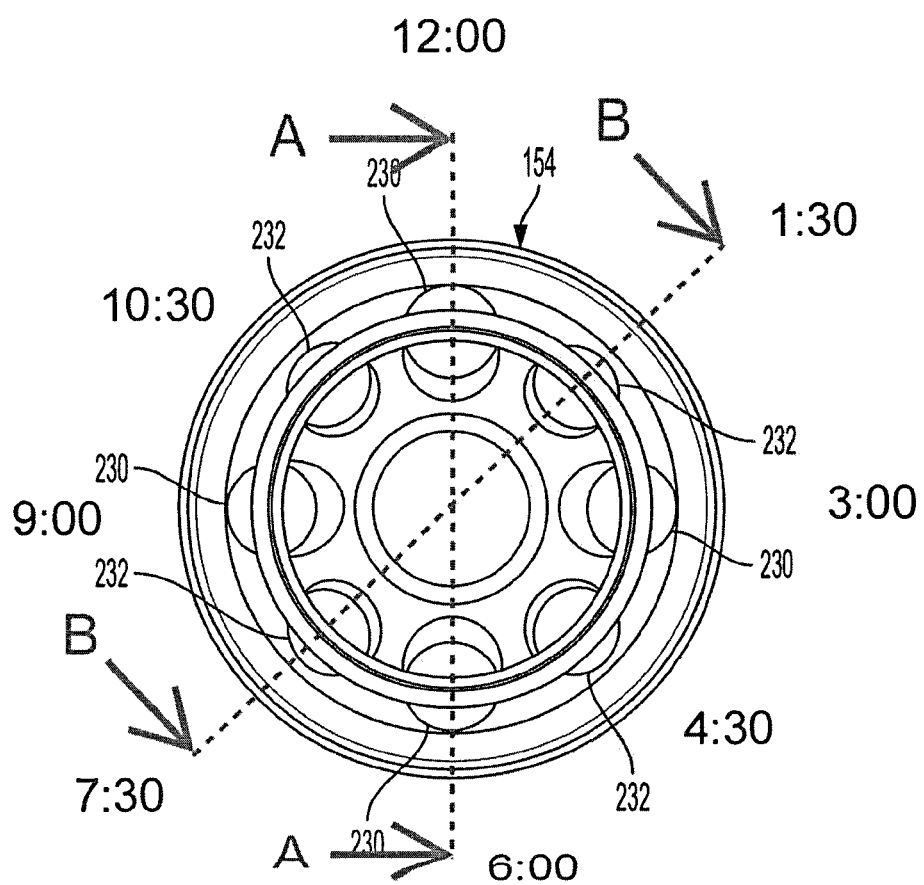
FIG. 2A is a top plan view illustrating additional detail of a head portion of an example of a constant velocity joint, showing the cross section associated to the first set of tracks and the cross section associated to the second set of tracks.

FIGS. 1A, 1B, and 2 illustrate an example of a portion of a constant velocity joint assembly, referred to generally as a constant velocity joint assembly 100 herein. The constant velocity joint assembly 100 may operate to provide rotational power at various angles. The constant velocity joint assembly 100 includes a structure 102. The structure 102 may include a head portion 104 and a shaft portion 106. The shaft portion 106 may be operatively connected to the head portion 104 such that the head portion 104 and the shaft portion 106 move with one another relative to a central axis 107 defined by the head portion 104 or the shaft portion 106. The shaft portion 106 may include an attachment feature, such as an aperture 105, to receive a portion of a component of another assembly to transfer rotational power thereto and to receive rotational power therefrom.

The head portion 104 may be sized to receive a set of track balls 108 to assist in transferring rotational power. The head portion 104 may define a cavity to receive a portion of a component to assist in transferring rotational power. The head portion 104 may include a first end 109, a second end 110, and an inner surface defining one or more tracks. The first end 109 may also be referred to as a closed end or a floor and the second end 110 may also be referred to as an open end. Each of the tracks may be sized to receive one or more track balls of the set of track balls 108. The one or more tracks may be shaped and arranged with one another to define a continuous shape and to provide NVH and strength benefits without having to use tracks with a mirror image of one another, without having to use a cage with spherical offsets, and without having to use previously disclosed line ratios or arc lengths.

For example, an inner surface of the head portion 104 may define a first set of tracks 112 and a second set of tracks 114. The first set of tracks 112 and the second set of tracks 114 may also be referred to as outer tracks herein. Each of the first set of tracks 112 may be oriented between two tracks of the second set of tracks 114 (as shown in FIG. 1B) such that each track of the first set of tracks 112 is opposite another track of the first set of tracks 112 relative to the central axis 107 and such that each track of the second set of tracks 114 is opposite another track of the second set of tracks 114 relative to the central axis 107. In one example, the tracks may be arranged to define a first configuration in which a position of each of the tracks is alternated in a pattern defined as 1-2-1-2-1-2-1-2, etc., where '1' represents one track of the first set of tracks 112 and '2' represents one track of the second set of tracks 114. In another example, the tracks may be arranged to define a second configuration in which a position of each of the tracks is arranged in a pattern defined as 1-1-2-2-1-1-2-2, etc. in which '1' represents one of the first set of tracks 112 and '2' represents one of the second set of tracks 114.

The constant velocity joint assembly 100 may further include a cage 120 and a structure 122. The cage 120 may include a plurality of apertures 124 and the structure 122 may include a plurality of curve portions 126. Each of the plurality of apertures 124 may be sized to receive a portion of one ball of the set of track balls 108. Each of the curve portions 126 may be shaped to align with one of the first set of tracks 112 or one of the second set of tracks 114 to define a ball channel sized to receive one ball of the set of track balls 108 to assist in facilitating a transfer of rotational power. Each of the curve portions 126 may be shaped to assist in defining the first configuration of the tracks or the second configuration of the tracks described above. Each of the plurality of apertures 124 may define a shape, such as an oval shape, to receive a portion of one ball of the set of track balls 108.

The head portion 104, the cage 120, and the inner race 122 may be arranged with one another to partially define a constant velocity joint having asymmetric tracks to assist in controlling an over-ball clearance between the inner and outer joints at articulation angles greater than ninety degrees to promote a more even loading of the balls transmitting torque between the inner and outer joints.

FIG. 2 illustrates a top plan view of an example of ball channels within a head portion of a continuous velocity joint, such as the head portion 104 described above. In this example, each track of the first set of tracks 112 is shown arranged with one of the curve portions 126 to define a first ball channel 230. Each track of the second set of tracks 114 is shown arranged with one of the curve portions 126 to define a second ball channel 232.

For purposes of illustration, each of the first ball channels 230 may each be represented by a "1" and each of the second ball channels 232 may be represented by a "2." In one example, the tracks may be arranged with one another in a sequence such as 1-2-1-2-1-2-1-2, etc. about the central axis 107 such that each of the first ball channels 230 is oriented opposite another of the first ball channels 230 relative to the central axis 107. In another example, the sequence may be 1-1-2-2-1-1-2-2, etc. relative to the central axis 107.

The sequencing is defined by a first embodiment where the first set of tracks are arranged at 12:00, 3:00, 6:00 and 9:00 positions, and the second set of tracks are arranged at 1:30, 4:30, 7:30 and 10:30 positions. In another embodiment, the first set of tracks are arranged at 12:00, 1:30, 6:00 and 7:30 positions, and the second set of tracks are arranged at 3:00, 4:30, 9:00 and 10:30 positions.

Referring to FIGS. 3-6, an example of a portion of a constant velocity joint 200 is illustrated. The constant velocity joint 200 includes an inner race or inner joint member 202, an outer race or outer joint member 204, a set of balls 208 and a cage 210 of which movement maybe guided by at least one ball tracked between the inner joint member and the outer joint member. The inner joint member may be, for example, connected to a drive shaft to assisting in transferring rotational power.

The inner joint 202 may be connected to a driveshaft 212 that extends along an axis Z. The inner joint member includes 202 an inner joint member outer surface 214 that extends between a first end and a second end along the axis. The inner joint member outer surface defines a plurality of tracks, including two sets of inner joint member tracks (also referred to herein as "first set of inner tracks 300" and "second set of inner tracks 302") that extend between the first inner joint end and the second inner joint end.

Referring to FIGS. 7A-8B, the inner ball groove paths or inner ball tracks 216 have an offset such that they define inner funnels in conjunction with the outer ball tracks. The inner funnels of the inner ball groove paths or inner ball tracks 216 are arranged to preload, bias, or push the cage towards an end wall or a floor of the outer joint. The inner ball groove paths or inner ball tracks have a first arc length.

The inner ball groove paths or inner ball tracks 216 of the inner joint may be arranged in adjacent pairs about the inner joint outer surface. A first ball track or first ball groove path of the adjacent pairs may have a first arrangement having a first ball circle diameter. The first arrangement having the first ball circle diameter may be different from the second arrangement having the second ball circle diameter.

Figure 5:
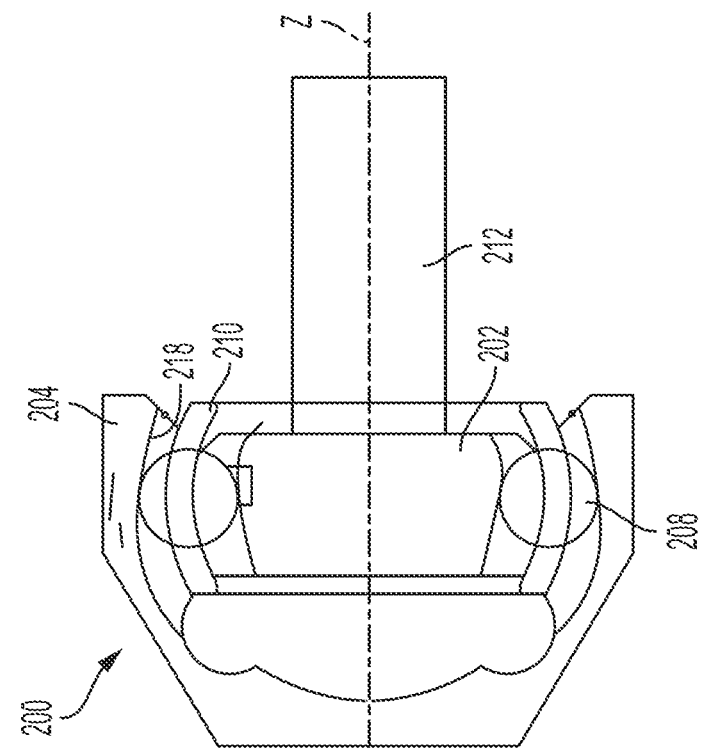
FIG. 5 is a front view, in cross-section, of a portion of an example of a constant velocity joint assembly shown in a third configuration.

The outer joint may be connected to a driven shaft that extends along an axis that may be disposed coaxial with the axis while in a first position, as shown in FIGS. 3 and 5. The outer joint includes an outer joint inner surface 218 that extends between a first outer joint end and a second outer joint end. The outer joint inner surface 218 terminates at an outer joint end wall or outer joint floor such that the second outerjoint end may be a closed end while the first outer joint end may be an open end.

The outer joint member inner surface 218 defines a plurality of outer joint membertracks, including two sets of outer joint member tracks that are arranged relative to theinner joint member tracks, which extend between the first outer joint end and the second outer joint end.

Referring to FIGS. 9A-10B, the outer ball groove paths or outer ball tracks 219 have an offset such that they define outer funnels. The outer funnels of the outer ballgroove paths or outer ball tracks are arranged to preload, bias, or push the cage towards an open end of the outer joint.

The preloading of the cage 210 by the inner funnel of the inner ball groove paths or inner ball tracks 216 and/or by the outer funnel of the outer ball groove paths or outerball tracks may inhibit the cage 210 from floating.

A "funnel" is defined as the angle formed between the tangents corresponding to the contact points between the ball and the inner race track and the contact points between the ball to the outer race track. Thus, in FIG. 11A the funnels extend towards the "open end" of the joint, while in FIG. 12A the funnels 220 extend towards the "closed end" or "floor" of the joint. In some embodiments, the angle defined by one of the funnels is greater than the angle defined by the other funnel.

The outer ball groove paths or outer ball tracks have a second arc length that may be different than the first arc length of the inner ball groove paths or inner ball tracks 216. The inner ball groove paths or inner ball tracks 216 of the inner joint may be arranged asymmetrically with respect to the outer ball groove paths or outer ball tracks 219 of the outer joint such that the respective ball groove paths or ball tracks of theinner joint and the outer joint may not mirrors of each other.

The outer ball groove paths or outer ball tracks 219 of the outer joint may be arranged in adjacent pairs about the outer joint inner surface. A first ball track or first ball groove path of the adjacent pairs may have a first arrangement having a first ball circle diameter. The first ball track or first ball groove path of the adjacent pairs maybe part of a first ball groove set of the outer ball groove paths or outer ball tracks 219, as shown in FIGS. 9A and 9B. The first ball groove set of the inner ball groove paths or inner ball tracks 216 may be aligned with the first ball groove set of the outer ball groove paths or outer ball tracks 219. A radial alignment of the first ball groove set of the inner joint and the first ball groove set of the outer joint may provide a combination of the first ball groove set of the inner joint and the first ball groove set opening in a direction that extends towards the open end of the outer joint.

A second ball track or second ball groove path of the adjacent pairs may have a second arrangement having a second ball circle diameter. The first arrangement having the first ball circle diameter may be different from the second arrangement having the second ball circle diameter.

The second ball track or second ball groove path of the adjacent pairs may be part of a second ball groove set of the outer ball groove paths or outer ball tracks, as shown in FIGS. 10A and 10B. The second ball groove set of the inner ball groove paths or inner ball tracks 216 may be aligned with the second ball groove set of the outer ball groove paths or outer ball tracks. A radial alignment of the second ball groove set of the inner joint and the second ball groove set of the outer joint may provide a combination in which the second ball groove set of the inner joint and the second ballgroove set open in a direction that extends towards the closed end or end wall of the outer joint.

Referring to FIGS. 3-6, the cage may be disposed between the outer joint inner surface and the inner joint outer surface. The cage may be arranged to receive a plurality of balls that are received within the arranged outer ball groove paths 219 and inner ball groove paths 216 to transmit torque between the inner joint and the outer joint.

Figure 6:
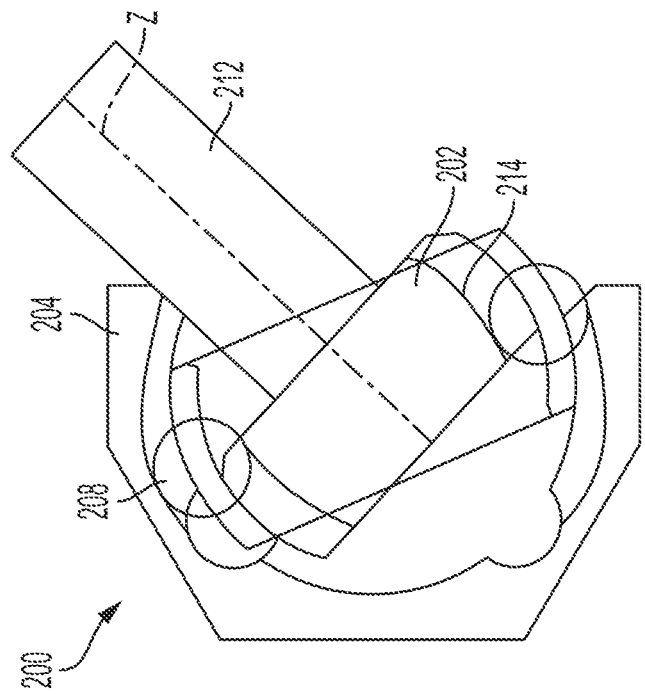
FIG. 6 is a front view, in cross-section, of the portion of the constant velocity joint assembly of FIG. 5 shown in a fourth configuration.

The asymmetry between the outer ball groove paths 219 and the inner ball groove paths 216 may allow for controlling the over ball clearance between the inner joint and theouter joint at high articulation angles, as shown in FIGS. 4 and 6. The asymmetry between the outer ball groove paths and the inner ball groove paths may cause the cage to be biased at low angles of articulation (e.g. less than 12°) and may allow overball static clearance at high angles of articulation (e.g. greater than) 40°.

As shown in FIGS. 3 and 4, the asymmetry between the outer ball groove paths 219 and the inner ball groove paths 216 may push the cage towards the open end of the outer joint. The pushing or biasing of the cage towards the open end of the outer jointmay avoid or inhibit noise, vibration, and harshness (NVH) issues. As shown in FIGS. 5 and 6, asymmetry between the outer ball groove paths and the inner ball groove paths may push the cage towards the end wall or floor of the outer joint.

The outer ball groove paths 219 and then ball groove paths may employ a combination of arcs and/or straight line segments and may not employ a change of curvature or inflection points from a concave shape to a convex shape or a convex shape to a concave shape.

FIGS. 11A through 11C illustrate portions of an example of a joint assembly, referred to generally as a joint assembly 150 herein. FIG. 11A is a side view, in partial cross-section with views of additional components of the joint assembly 150 overlaid thereupon. FIG. 11B relates to a first set of tracks of the joint assembly 150 and FIG. 11C relates to a second set of tracks of the joint assembly 150.

The joint assembly 150 includes a head portion 154, a shaft portion 156 secured to an inner race, a cage 160, and a set of track balls 162. The first set of tracks and the second set of tracks may be arranged with one another such that each ball of the set of track balls 162 may exert a force on the cage 160 in a direction toward an open end 166 of the head portion 154. The shaft portion 156 may define a longitudinal axis 169. The shaft portion 156 may be secured to components of another assembly such that the head portion 154 and the shaft portion 156 assist in transferring a rotational power therebetween. The set of track balls 162 may be similar to the set of track balls 108 described above.

In one example, the head portion 154 may include an inner surface defining the first set of tracks. Each of the first set of tracks may define an outer race track path 172. FIG. 11B illustrates further detail of the outer race track path 172. For example, the outer race track path 172 may include a first segment 178 being substantially straight and having a positive slope relative to the longitudinal axis 169. The outer race track path 172 may further include a second segment 180 defining an arc having a concave shape relative to the longitudinal axis 169, and a third segment 182 being substantially straight and having a negative slope relative to the longitudinal axis 169.

Each of the second set of tracks may define an inner race track path 183. FIG. 11C illustrates further detail of the inner race track path 183. For example, the inner race track path 183 may include a first segment 186 being substantially straight and having a positive slope relative to the longitudinal axis 169, a second segment 188 defining an arc having a convex shape relative to the longitudinal axis 169, and a third segment 190 being substantially straight and having a negative slope relative to the longitudinal axis 169. The outer race track path 172 and the inner race track path 183 may be arranged with one another to alternate locations about the longitudinal axis 169 or to alternate positions in pairs about the longitudinal axis 169 as further described herein.

FIGS. 12A through 12C illustrate additional examples of portions of the joint assembly 150. FIG. 12B relates to an example of a third set of tracks of the joint assembly 150 and FIG. 12C relates to an example of a fourth set of tracks of the joint assembly 150. The third set of tracks and the fourth set of tracks may be arranged with one another such that each ball of the set of track balls 162 may exert a force on the cage 160 in a direction toward the closed end 193 of the head portion 154.

The inner surface of the head portion 154 may define the third set of tracks and the fourth set of tracks. Each of the third set of tracks may define an outer race track path 194. FIG. 12B illustrates further detail of the outer race track path 194. For example, the outer race track path 194 may include a first segment 196 defining an arc having a concave shape relative to the longitudinal axis 169, a second segment 198 defining an arc having a concave shape relative to the longitudinal axis 169, and a third segment 200 being substantially straight and having a negative slope relative to the longitudinal axis 169.

Each of the fourth set of tracks may define an inner race track path 210. FIG. 12C illustrates further detail of the inner race track path 210. For example, the inner race track path 210 may include a first segment 212 being substantially straight and having a positive slope relative to the longitudinal axis 169, a second segment 214 defining an arc having a convex shape relative to the longitudinal axis 169, and a third segment 216 defining an arc having a convex shape relative to the longitudinal axis 169. The outer race track path 194 and the inner race track path 210 may be arranged with one another to alternate locations about the longitudinal axis 169 or to alternate positions in pairs about the longitudinal axis 169 as further described herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A constant velocity joint assembly comprising:
   an outer joint member defining a first longitudinal axis and including a closed end, an open end, a first set of outer tracks extending at least partially between the closed end and the open end, and a second set of outer tracks extending at least partially between the closed end and the open end; and
   an inner joint member defining a second longitudinal axis coaxial with the first longitudinal axis and including a first set of inner tracks and a second set of inner tracks, the inner joint including an attachment feature to receive a driveshaft,
   wherein a path followed by the center of a ball in the first set of inner tracks is constrained by a first outer race track path and a first inner race track path,
   wherein the path followed by the center of a ball in the second set of inner tracks is constrained by a second outer race track path and a second inner race track path, wherein the second set of inner tracks and the second outer race track path each define a respective arc length extending in longitudinal directions corresponding to the first longitudinal axis and the second longitudinal axis, wherein the arc length of the second set of inner tracks is different than the arc length of the second outer race track path, wherein the first outer race track path and the second outer race track path each include a combination of arcs and straight line segments.

2. The constant velocity joint assembly of claim 1, further comprising a cage disposed between an outer surface of the inner joint member and an inner surface of the outer joint member.

* * * * *